United States Patent [19]

Hayasaka et al.

[11] Patent Number: 5,402,421
[45] Date of Patent: Mar. 28, 1995

[54] BUS CONTROL DEVICE AND BUS CONTROL METHOD

[75] Inventors: Kazumi Hayasaka; Hirohide Sugahara, both of Kawasaki, Japan

[73] Assignee: Fujitsu Limited, Kawasaki, Japan

[21] Appl. No.: 138,082

[22] Filed: Oct. 20, 1993

[30] Foreign Application Priority Data

Oct. 30, 1992 [JP] Japan .................. 4-292871

[51] Int. Cl.⁶ ................................. H04J 3/02
[52] U.S. Cl. ................... 370/85.2; 370/85.1
[58] Field of Search ............ 370/85.1, 85.2, 85.3, 370/94.1, 100.1, 85.7, 95.1, 85.6, 85.8, 85.9; 340/825.08, 825.5, 825.51

[56] References Cited

U.S. PATENT DOCUMENTS 5,297,292  3/1994  Morimoto et al. .................. 370/85.2

FOREIGN PATENT DOCUMENTS 64-26233  1/1989  Japan .
3-110656  5/1991  Japan .
3-256154  11/1991  Japan .
3-265054  11/1991  Japan .

Primary Examiner—Douglas W. Olms
Assistant Examiner—Dang Ton
Attorney, Agent, or Firm—Staas & Halsey

[57] ABSTRACT

When a unit connected to a data transfer bus on which data transfer is controlled synchronously with a bus cycle makes a request for using the bus, permission is granted to one of the units which have made the request. The permission to use the bus is switched over at a bus cycle when data transfer is completed in the unit. Consequently, the bus cycle can be shortened, and the speed of the data transfer by the bus can be increased. To achieve this, the unit which has granted permission to use the bus sends out a notifying signal notifying switch over of the permission to use the bus at a bus cycle, which precedes the bus cycle when data transfer is completed. The permission to use the bus granted to the unit, which has completed data transfer, is cancelled on the basis of the notifying signal at the bus cycle when data transfer is completed. Permission to use the bus is granted to a subsequent unit at that bus cycle when there is the subsequent unit which is requested use of the bus.

5 Claims, 11 Drawing Sheets

BUS CONTROL DEVICE AND BUS CONTROL METHOD

BACKGROUND OF THE INVENTION

The present invention relates to a bus control device and a bus control method.

As shown in FIG. 1, a plurality of data processing units 10-1 through 10-n and a bus controller are connected to a data transfer bus through which the data is transferred synchronously with a bus cycle. Each of the units 10-1 through 10-n performs data transfer when the bus controller 12 has granted its request to use the bus. The bus controller 12 grants one of the units which are requesting use of the bus permission to use the bus, and switches over the permission at a bus cycle when data transfer is completed in the unit.

As shown in FIG. 2, the individual unit 10-i includes a control circuit 14-i which issues a request signal (BRQ) requsting use of the bus to the bus controller 12 and performs data transfer when it has received a granting signal (BGR) granting use of the bus from the bus controller 12, a RAM 16-i for storing the data which has been transferred or is to be transferred through the data transfer bus, and a transfer completion cycle informing circuit 18-i for sending, to the bus controller 12, a data transfer completion information signal (BCPT) which indicates that data transfer has been completed at a bus cycle when the data transfer is completed.

As shown in FIG. 3, the bus controller 12 includes a transfer completion cycle detection circuit 22 for sending, to an arbitration circuit 20, a signal switch over instructing signal (LAST. CYC) which instructs switch over of the signal when it has received the data transfer completion informing signal and thereby detects the transfer completion cycle, and an arbitration circuit 20 for performing switch over of the permission to use the bus when it receives the signal switch over instructing signal.

The operation of a conventional bus control device will now be described.

FIG. 4 shows an example of a timing chart for the conventional bus control device.

When the unit 10-1 desires to obtain the permission to use the bus, the control circuit 14-1 sets the requesting signal requesting use of the bus (BRQ) high. When the bus is not in use at that time, the arbitration circuit 20 of the bus controller 12 sends the granting signal (BGR) which grants the unit 10-1 permission to use the bus at a bus cycle T1. The control circuit 14-1 receives the bus granting signal, and performs transfer of data through the bus.

In that case, the bus requesting signal (BRQ) of the control circuit 14-1 goes low synchronously with the reception of the bus granting signal.

Thereafter, when the data transfer is completed at a bus cycle T5, the transfer completion cycle informing circuit 18-1 sends the data transfer completion informing signal (BCPT) at the same cycle T5.

Upon receipt of the data transfer completion informing signal (BCPT) at the cycle T5, the transfer completion cycle detecting circuit 22 of the bus controller 12 informs the arbitration circuit 20 of that signal by sending a signal switch over instructing signal (LAST, CYC), and the arbitration circuit 20 sets the bus granting signal (BGR) low.

Next, the operation executed when the bus requesting signals of the plurality of units of a computer system including the plurality of units, e.g., a bus requesting signal (BGQ1) of the unit 10-1 and a bus requesting signal (BRQ2) of the unit 10-2, are concurrently high will be described with reference to FIG. 5.

In that case, the bus controller 12 determines the order of priority of those signals, and sets the bus granting signal (BGR1) high at T1 to grant the higher priority unit (which is the unit 10-1 in this example) permission to use the bus.

Hence, the unit 10-1 acquires the permission to use the bus, and accordingly transfers data via the bus. When data transfer is completed at T4, the transfer completion cycle informing circuit 18-1 of the unit 10-1 informs the bus controller 12 of the data transfer completion informing signal (BCPT) at the same cycle T4.

Upon receipt of the data transfer completion informing signal (BCPT), the transfer completion cycle detecting circuit 22 sends the signal switch over instructing signal (LAST. CYC) to the arbitration circuit 20, and the arbitration circuit 20 accordingly sets low the granting signal (BGR1) granting the unit 10-1 permission to use the bus, and concurrently with this, sets high the bus granting signal (BGR2) granting the unit 10-2 which has output the bus requesting signal (BRQ2) permission to use the bus at the cycle T4. Hence, the unit 10-2 acquires the permission to use the bus, transfers data via the bus, and sends out the data transfer completion informing signal (BCPT) at the cycle T8 when data transfer is completed. Upon receipt of the data transfer completion informing signal (BCPT), the transfer completion cycle detecting circuit 22 of the bus controller 12 sends the signal switch over instructing signal (LAST. CYC) to the arbitration circuit 20, and the arbitration circuit 20 accordingly sets low the bus granting signal (BGR2) granting the unit 10-2 permission to use the bus.

In the above-described conventional example, the bus granting signals (BGR) are switched over at the cycle T4, as mentioned above. In this example, when the bus granting signals are switched over, a transmission path which goes from the unit 10-1 to the unit 10-2 via the bus controller 12 must be established in a single cycle in order to allow the unit 10-1 to set the data transfer completion informing signal (BCPT) high and then allow the bus controller 12 which detects that signal to set high the bus granting signal (BGR2) granting the unit 10-2 permission to use the bus in the cycle T4, as shown in FIG. 6. Because the transfer delay generated when the signal is transferred in that path (a path from (a) to (b) via the bus controller 12) must be absorbed in a single cycle, the bus cycle cannot be shortened and a high-speed operation can thus be achieved despite of the fact that the transfer delay which occurs between the units is smaller than that transfer delay.

SUMMARY OF THE INVENTION

An object of the present invention is to provide a bus control device which enables a bus cycle to be shortened to increase the operation speed of a system without deteriorating the efficiency with which the bus is used by providing, in the unit connected to a system bus, a circuit for notifying switch over of the bus granting signal (BGR) beforehand at a cycle which is at least one cycle before the data transfer completion cycle, and a signal line therefor, and by providing, in the bus controller, a circuit for detecting that signal, and a circuit for switching over the bus granting signal (BGR) at a cycle which follows the cycle when detection takes place when that signal is detected. Consequently, the transmission path can be divided, and this enables the bus cycle to be shortened.

To achieve the above-described object, the present invention provides a bus control device which comprises a data transfer bus on which data transfer is performed synchronously with a bus cycle, a plurality of data processing units, and a bus controller. Each of the units performs data transfer when the bus controller has granted the unit its request to use the bus. The bus controller grants one of the units which have requested use of the bus permission to use the bus, and switches over the permission to use the bus at a bus cycle when that unit has completed data transfer. Each of the units includes a switch over notifying unit for sending, to the bus controller, a notifying signal notifying switch over of the permission to use the bus at a bus cycle which precedes the data transfer completion bus cycle. The bus controller includes a time adjusting unit for holding the received notifying signal until the bus cycle when data transfer is completed and for sending the notifying signal which has been held to a switch-over instructing unit at that data transfer completion bus cycle, and a switch over instructing unit for cancelling the permission to use the bus granted to the unit which has completed data transfer at a data transfer completion bus cycle when it has received the time adjusted notifying signal and for granting a subsequent unit permission to use the bus at that bus cycle when there is a subsequent unit which is requesting use of the bus. Consequently, the transmission path can be divided, and this allows the bus cycle to be shortened.

The procedures of the processing executed in the bus cotnrol device and the bus control method according to the present invention will now be described.

Request for using the data transfer bus is made from one of the plurality of units connected to the data transfer bus to the bus controller.

When it is one unit that has made the request for using the bus, the bus controller grants that unit permission to use the bus.

When it is the plurality of units that have made the request for using the bus, the bus controller selects one of the units which have made the request and grants that unit permission to use the bus.

The unit which has been granted permission to use the bus starts transferring data using the bus.

After the data transfer has been initiated, the switch over notifying unit sends out, to the bus controller, the notifying signal notifying switch over of the permission to use the bus beforehand at a bus cycle which precedes the data transfer completion bus cycle.

When the notifying signal reaches the bus controller, the time adjusting unit of the bus controller holds the notifying signal until the bus cycle when data transfer is completed in that unit.

The time interval during which the notifying signal is held depends on in the bus cycle in which the notifying unit notifies completion of the data transfer. In other words, if the notifying unit gives notice at a bus cycle which is immediately before the data transfer completion bus cycle, the time interval during which the notifying signal is held is a single cycle. If completion of the data transfer is notified at a bus cycle which is a few bus cycles before the data transfer completion bus cycle, the time adjusting unit holds the notifying signal for a few bus cycles.

The notifying signal, which has been held in the time adjusting unit, is sent out to the switch over instructing unit of the bus controller at the bus cycle of data transfer completion. The switch over instructing unit cancels the permission to use the bus granted to the unit which has completed data transfer at the bus cycle of data transfer completion.

At that time, if there are other units which are requesting use of the bus, the permission to use the bus is granted to one of those units at the bus cycle when the permission to use the bus is cancelled, i.e., at the bus cycle of data transfer completion.

In another preferred form, the requesting signal requesting use of the bus is used as the switch over notifying signal. In this form, a switch over notifying unit includes a switch over notifying/instructing unit for instructing output of a notifying signal, and a transfer control unit for sending out a bus requesting signal requesting use of the bus when instructed.

In still another preferred form, the requesting signal requesting use of the bus is not set low by the granting signal granting the use of the bus from the controller. Instead, a switch over notifying/instructing unit provided in each of the units instructs the transfer control unit to set the requesting signal low as a notification of completion of data transfer. Using the low bus requesting signal as the notifying signal, the switch over instructing unit cancels the permission to use the bus granted to the unit which has completed data transfer at the bus cycle when data transfer is completed, and grants another unit which is requesting permission to use the bus permission to use the bus when there is another unit.

The objects, features, and advantages of the present invention will become more apparent from the following description made with reference to the drawings.

DETAILED DESCRIPTION OF THE PREFERRED EMBODIMENTS

An embodiment of the present invention will be described below.

Figure 1:
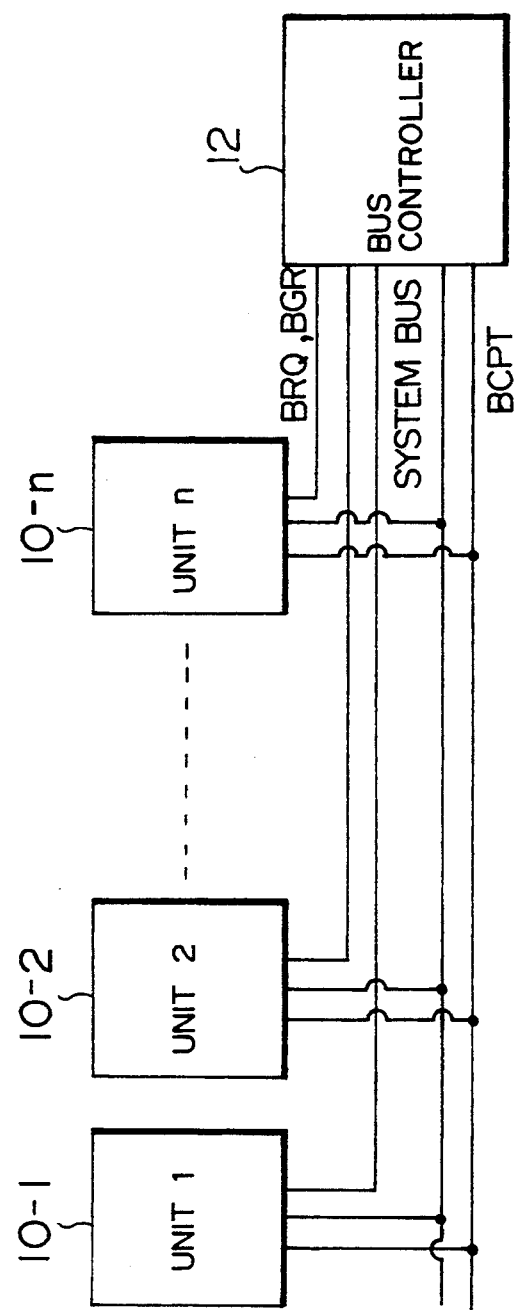
FIG. 1 is a block diagram of a system bus of a conventional bus control device.
Figure 2:
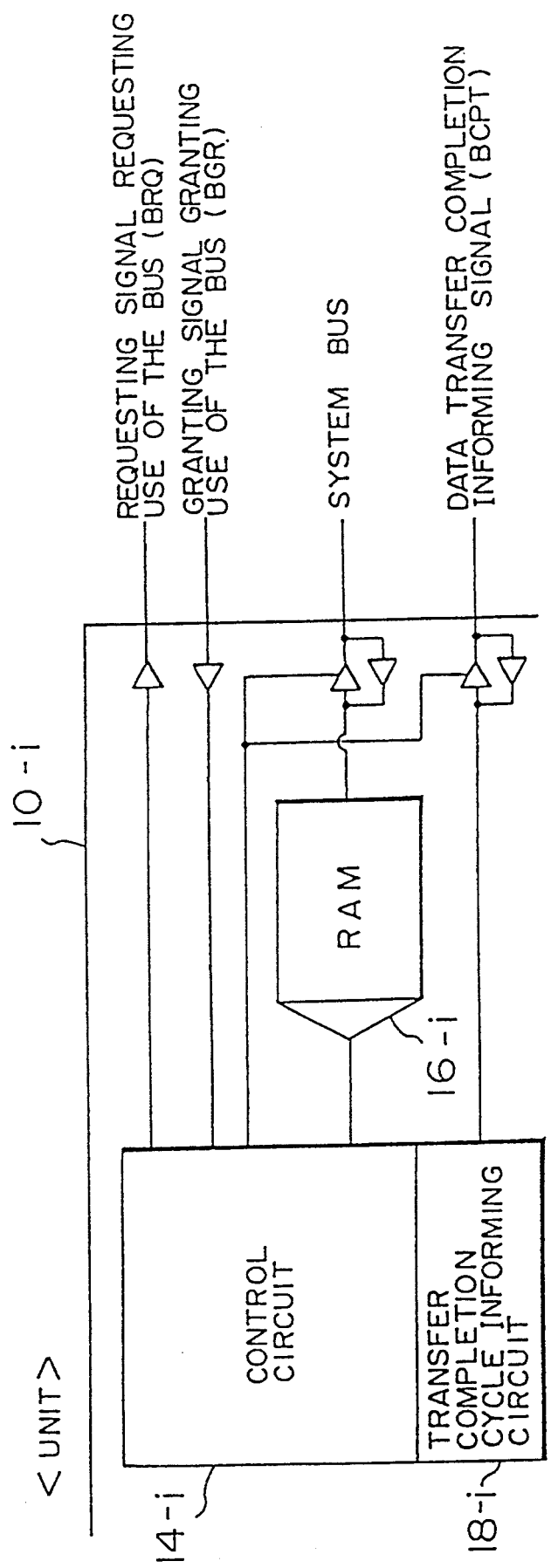
FIG. 2 is a block diagram of a unit of the conventional bus control device.
Figure 3:
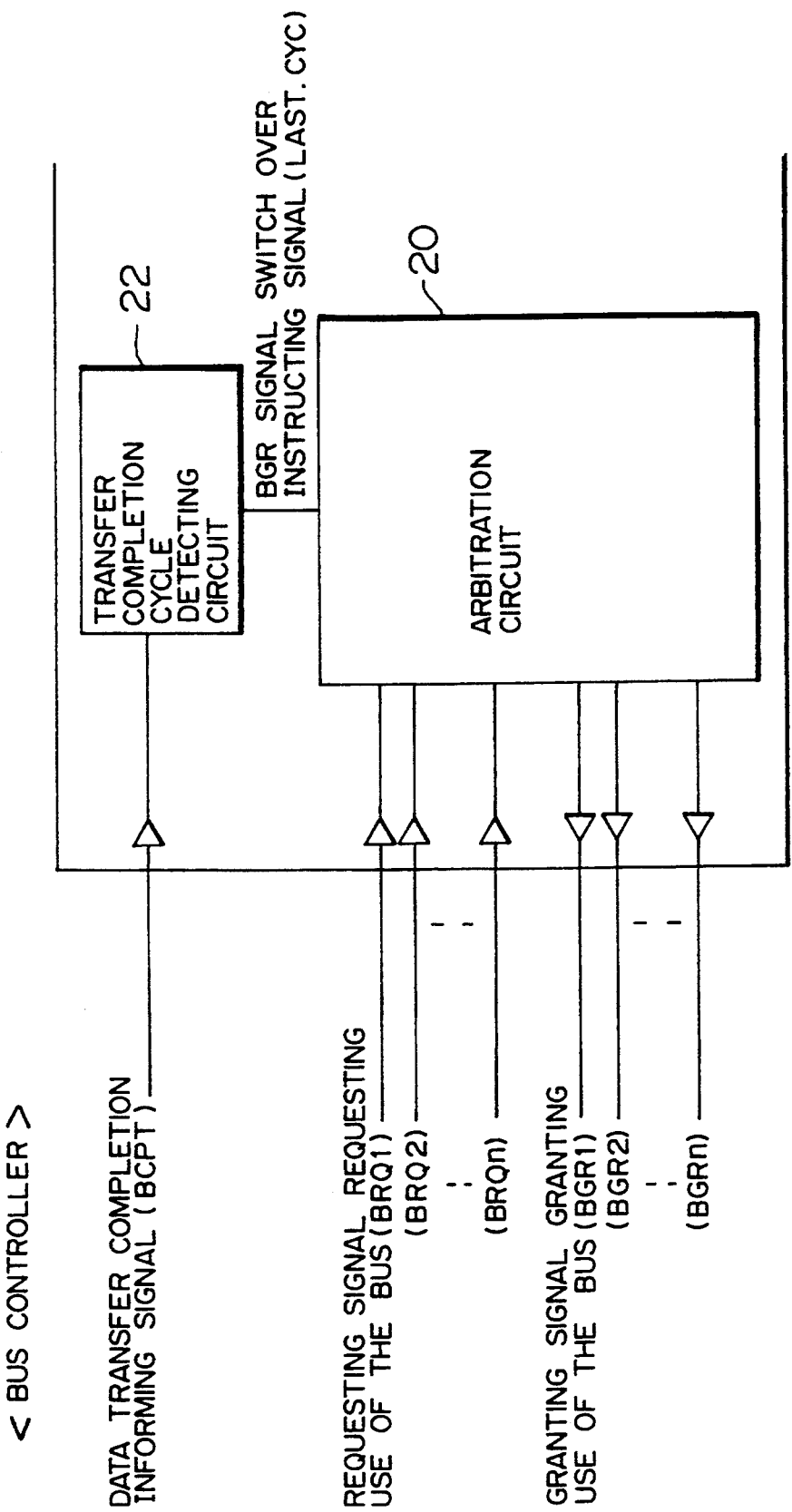
FIG. 3 is a block diagram of a bus controller of the conventional bus control device.
Figure 4:
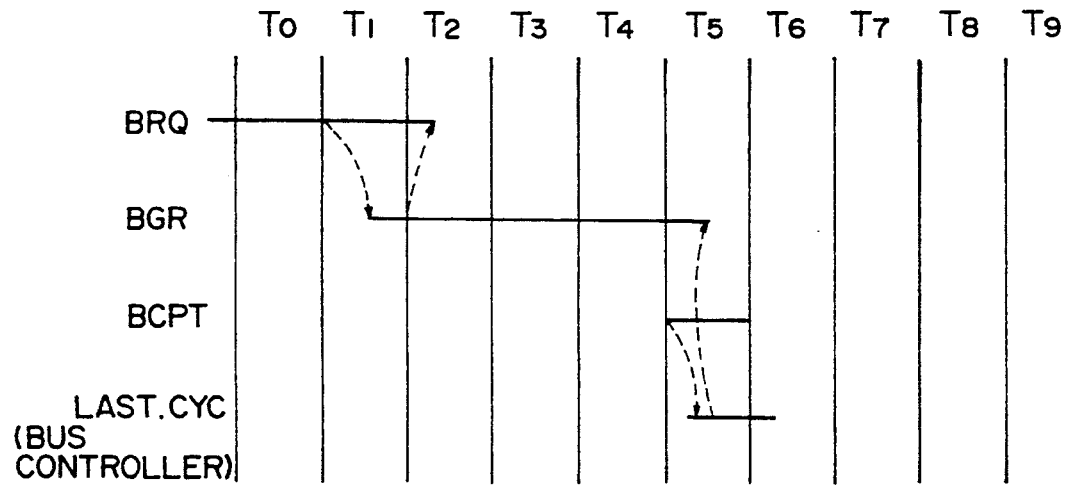
FIG. 4 is a timing chart (1) of the conventional bus control device.
Figure 5:
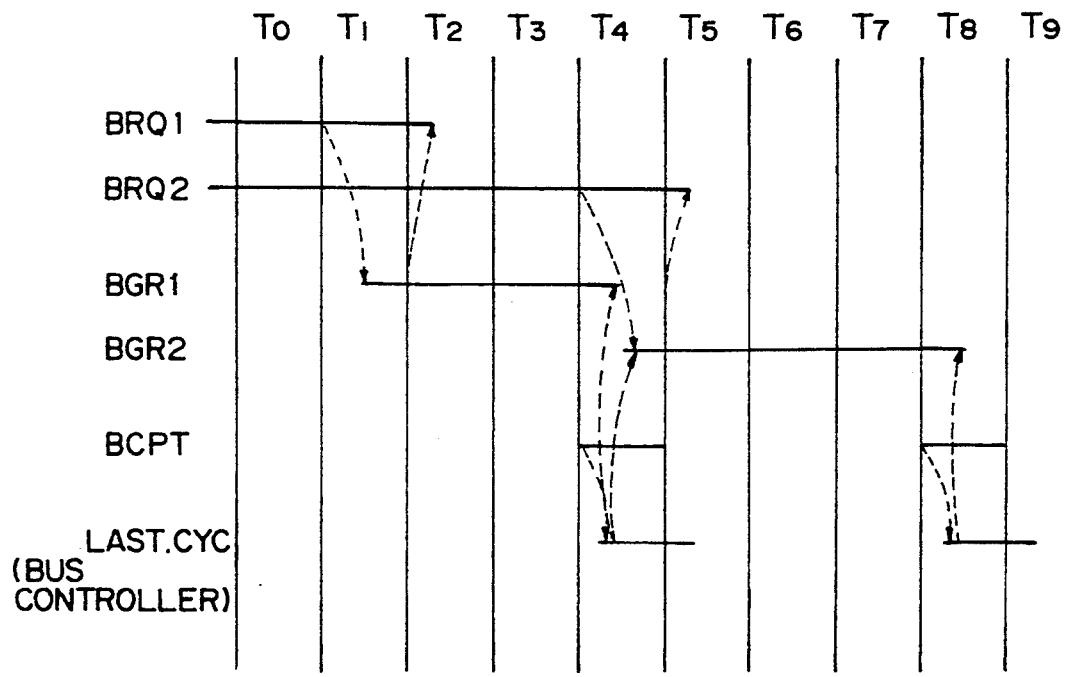
FIG. 5 is a timing chart (2) of the conventional bus control device.
Figure 6:
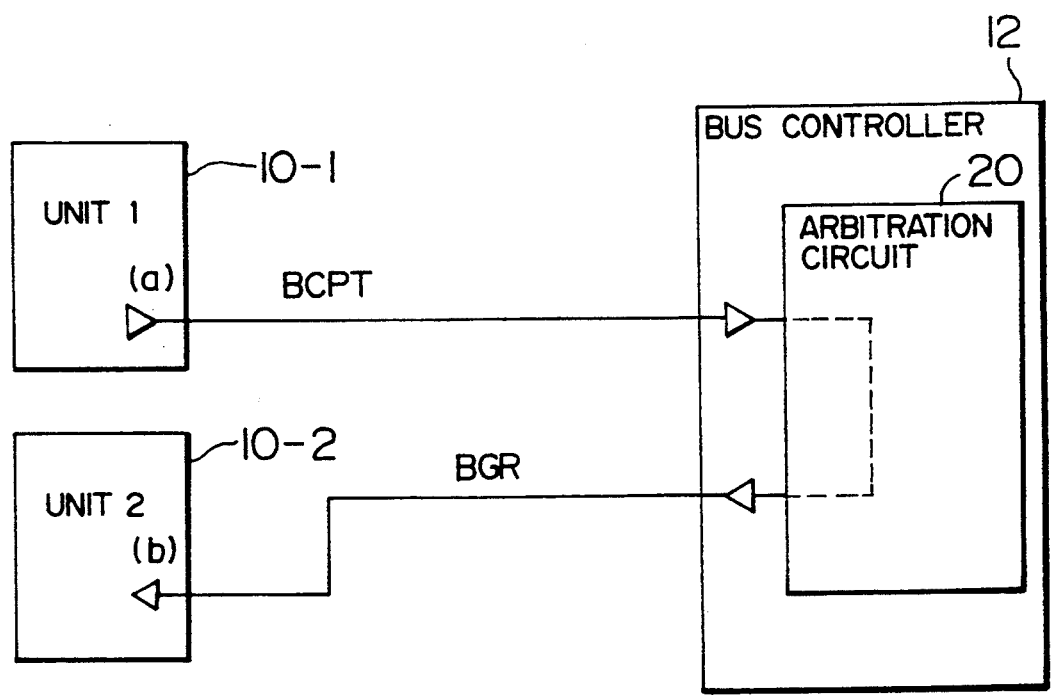
FIG. 6 illustrates a transmission path of the conventional bus control device.
Figure 7:
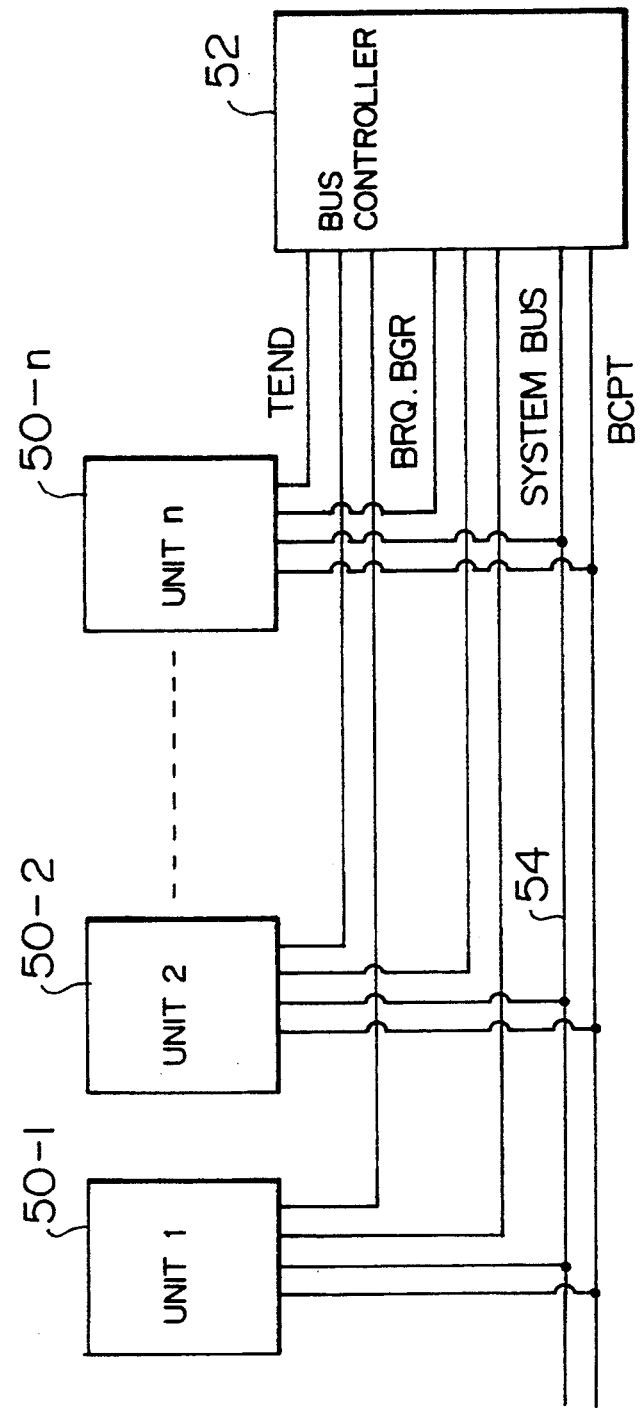
FIG. 7 is a block diagram of a system bus of an embodiment according to the present invention.

FIG. 7 is a system diagram showing a device for and method of bus control of this embodiment.

As shown in FIG. 7, the entire system of this embodiment includes a plurality of data processing units 50-1 through 50-n, a data transfer bus 54 to which the plurality of data processing units 50-1 through 50-n and a bus controller 52 are connected and through which data is transferred synchronously with a bus cycle, and a bus controller 52 for sending out a permission signal to use the bus to the highest priority unit in the units 50-1 through 50-n that are requesting to use the bus when it has received the requesting signals to use the bus from any of the units 50-1 through 50-n.

In addition to the data transfer bus 54, a signal line for a requesting signal (BRQ) requesting use of the bus, a signal line for a granting signal (BGR) granting use of the bus, a signal line for a data transfer completion informing signal (BCPT) which indicates completion of the data transfer, and a switch over notifying signal (TEND) which notifies switch over beforehand extend between each of the units 50-1 through 50-n and the bus controller 52.

Figure 8:
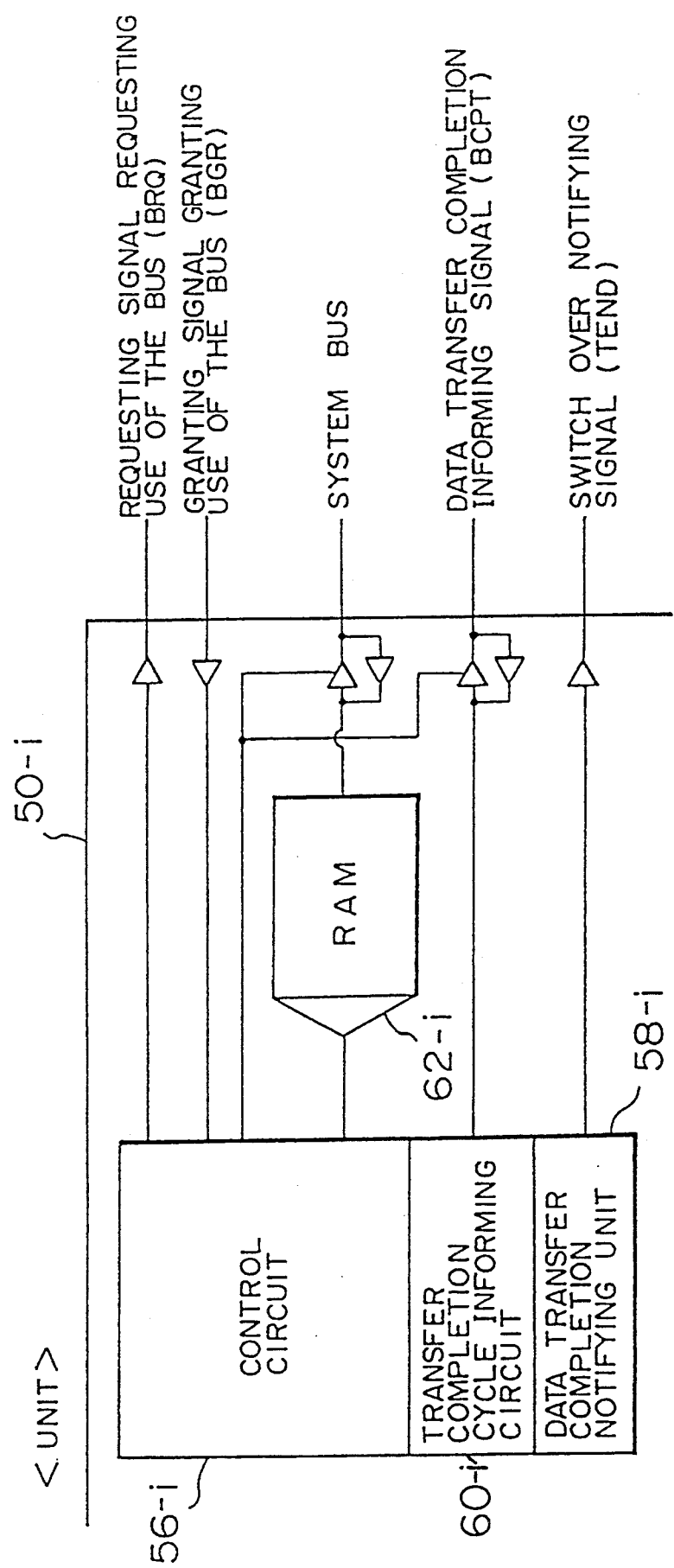
FIG. 8 is a block diagram of a unit of the first embodiment.

FIG. 8 shows the unit 50-i of the first embodiment.

As shown in FIG. 8, the unit 50-i includes a transfer control unit 56-i for outputting a requesting signal to use the bus to the bus controller 52 and for performing data transfer when it receives a granting signal granting permission to use the bus from the bus controller 52, a data transfer completion notifying unit 58-i for sending out a notifying signal notifying switch over of the permission to use the bus to the bus controller 52 at a bus cycle which precedes the bus cycle when the data transfer by the unit 50-i is completed, and the transfer completion cycle informing circuit 60-i for sending out a data transfer completion informing signal to the bus controller 52 when completion of the data transfer is detected, and a RAM 62-i for storing the data which is to be or has been transferred via the data transfer bus 54.

Figure 9:
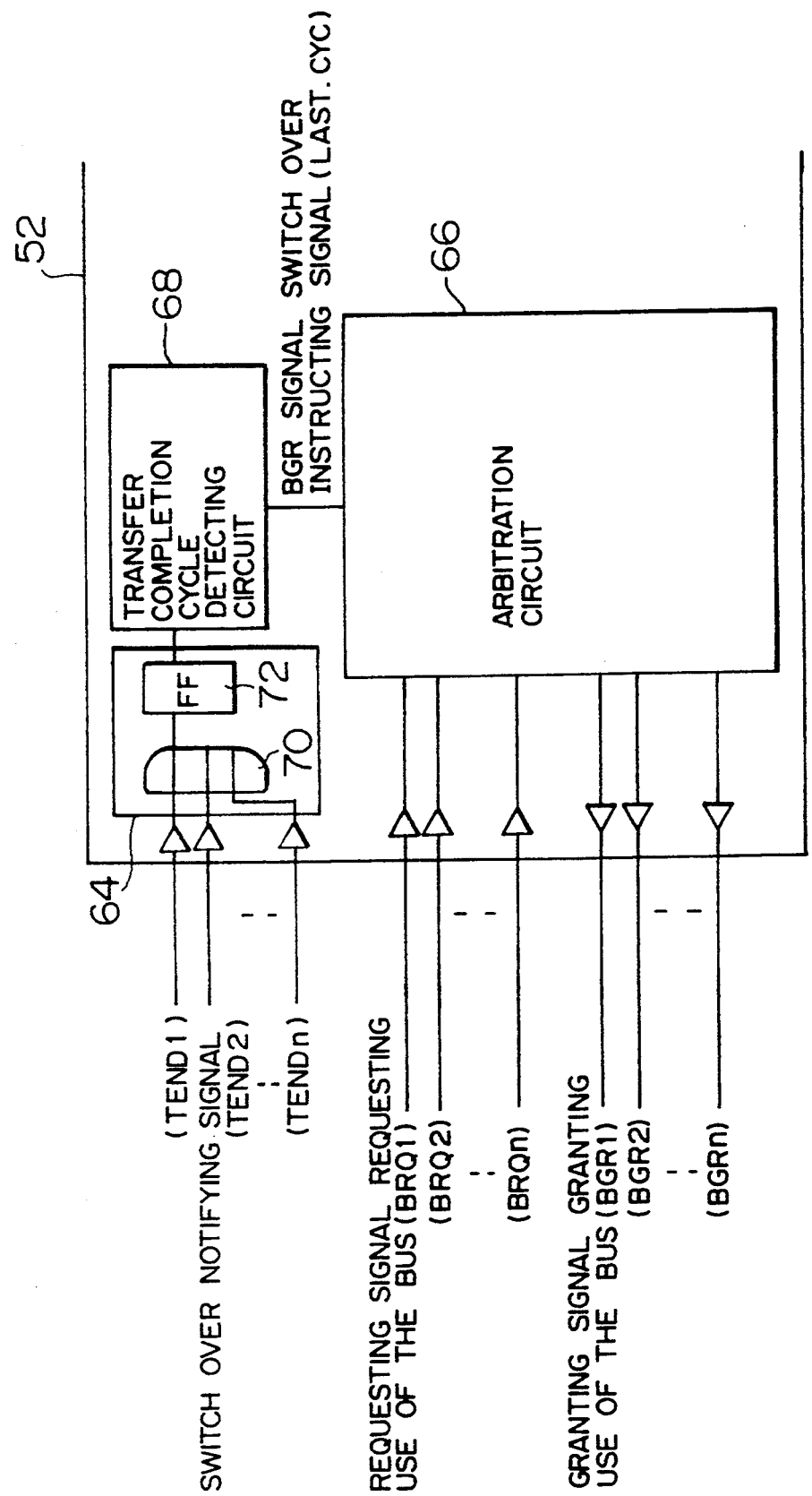
FIG. 9 is a block diagram of a bus controller of the first embodiment.

FIG. 9 shows the bus controller 52 of this embodiment.

As shown in FIG. 9, the bus controller 52 includes a time adjusting unit 64 for holding the notifying signal until the data transfer completion bus cycle and for sending out the notifying signal which has been held to a switch over instructing unit at that bus cycle, a transfer completion cycle detecting unit 68 which is a switch over instructing unit for cancelling the permission to use the bus granted to the unit which has completed data transfer at the data transfer completion bus cycle when it has received the time adjusted notifying signal and for setting high a signal switch over instructing signal (LAST. CYC) instructing permission to use the bus to a subsequent unit at the same bus cycle when there is a subsequent unit who is requesting to use the bus, and an arbitration circuit 66 for outputting the granting signal (BGR) granting the permission to use the bus on the basis of the instructing signal from the transfer completion cycle detecting circuit 68 or the bus requesting signal to manage the bus usage.

The time adjusting circuit 64 includes a logical OR element 70, and a flip-flop (FF) 72 for holding the signal for a time interval corresponding to the single bus cycle.

The number of FFs 72 provided in the time adjusting circuit 64 is not limited to one but is determined by when the data transfer completion notifying unit 58-1 through 58-n provided in the units 50-1 through 50-n notify completion of the data transfer beforehand.

More specifically, when completion of the data transfer is notified one cycle before the actual completion, the number of FFs 72 is one. When completion of the data transfer is notified a few cycles before the actual completion, a few FFs 72 are required.

The procedures of the processing executed in this embodiment will be described below.

Figure 10:
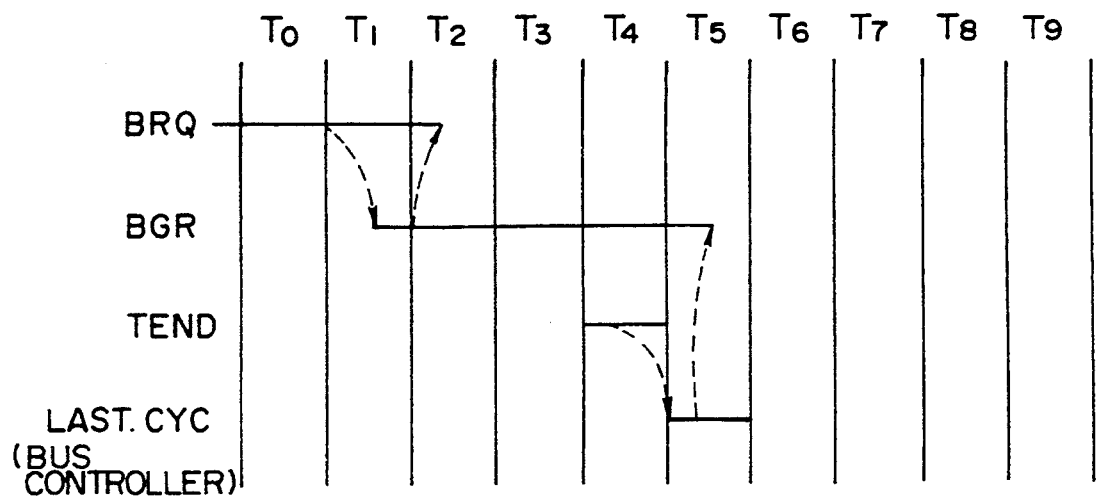
FIG. 10 is a timing chart (1) of the first embodiment.

As shown in FIG. 10, when the requesting signal (BRQ) output from the control circuit 56-i of the unit 50-i to request to use the bus for data transfer is high, the arbitration circuit 66 of the bus controller 52 sends out the bus granting signal (BGR) granting the unit 50-i permission to use the bus at the cycle T1.

Upon receipt of the bus granting signal (BGR), the control circuit 56-i of the unit 50-i instructs transfer of the data stored in the RAM 62-i to the unit 50-i via the data transfer bus 54.

As the data transfer proceeds, the data transfer completion notifying unit 58-i sends out the data transfer completion notifying signal (TEND) to the bus controller 52 at the cycle T4 which is immediately before the bus cycle of the data transfer completion.

The time adjusting unit 64 of the bus controller 52 accordingly receives that notifying signal, and holds it for one cycle until T5 when data transfer is completed.

When the time period corresponding to one bus cycle has passed, the time adjusted notifying signal is sent out to the transfer completion cycle detecting circuit 68 at T5 when the data transfer completion cycle starts.

The transfer completion cycle detecting circuit 68 receives the notifying signal, and sends out the signal switch over instructing signal (LAST. CYC) instructing switch over of the permission to use to bus to the arbitration circuit 66 at the bus cycle T5 of the data transfer completion.

The arbitration circuit 66 receives the signal switch over instructing signal, and sets low the granting signal (BGR) granting the unit 50-i permission to use the bus and thereby cancels the permission.

The procedures of the processing executed when requests to use the bus are made from a plurality of units, will be described below with reference to FIG. 11.

Figure 11:
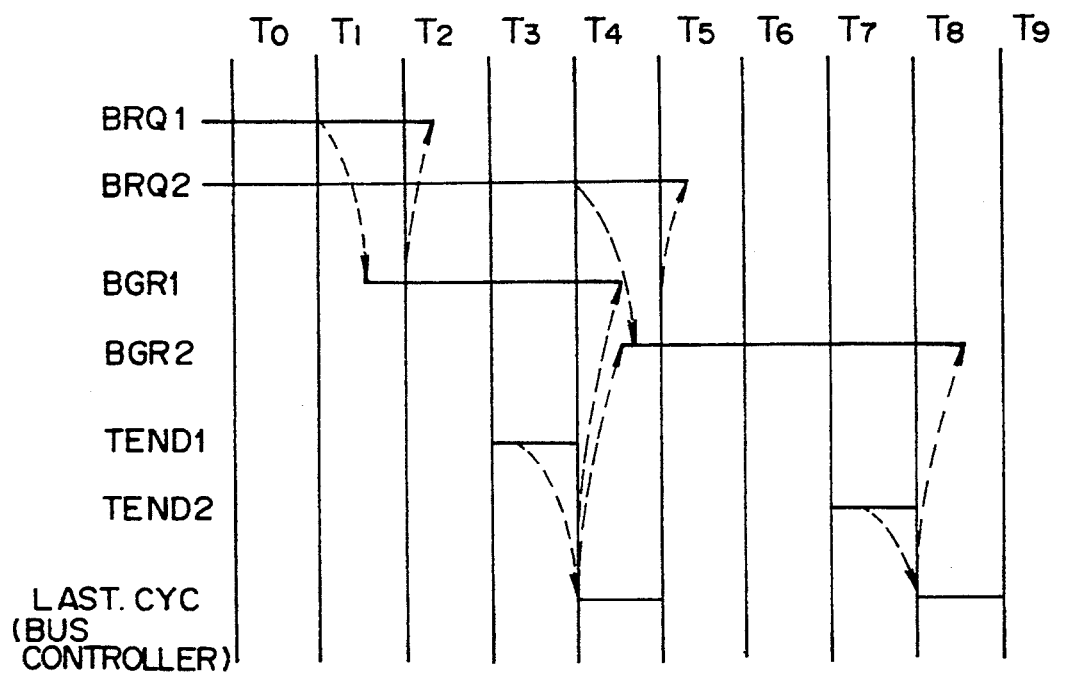
FIG. 11 is a timing chart (2) of the first embodiment.

It is assumed that requesting signals (BRQ1, BRQ2) output from the control circuits 56-1 and 56-2 of the units 50-1 and 50-2 for requesting use of the bus for data transfer are high at the same time, as shown in FIG. 11. The requesting signals are sent to the arbitration circuit 66 of the bus controller 52. The arbitration circuit 66 determines the order of priority of the units 50-1 and 50-2, and sends out a bus granting signal (BGR1) granting the unit 50-1 permission to use the bus when priority is given to the unit 50-1.

Upon receipt of the bus granting signal, the control circuit 56-1 of the unit 50-1 starts transferring the data stored in the RAM 62-1 to the remote unit 50-i via the data transfer bus 54. After data transfer has been started, the data transfer completion notifying unit 58-1 to which permission to use the bus is granted sends out a notifying signal (TEND1) to the bus controller 52 at T3, which is one cycle before the data transfer completion bus cycle. The time adjusting unit 64 of the bus controller 52 receives this notifying signal, holds it in the FF 72 for a time period corresponding to one cycle, and sends it out to the transfer completion cycle detecting circuit 68 at the bus cycle T4 of the data transfer completion.

Hence, the transfer completion cycle detecting circuit 68 sends out the signal switch over instructing signal (LAST. CYC) to the arbitration circuit 66 at the same bus cycle T4.

Upon receipt of the signal switch over instructing signal, the arbitration circuit 66 cancels the permission to use the bus granted to the unit 50-1 at the same bus cycle. Further, the arbitration circuit 66 sends out a bus granting signal (BGR2) to the subsequent unit 50-2 which is requesting to use the bus at the same bus cycle.

Thus, the control circuit 56-2 of the subsequent unit 50-2 to which permission to use the bus has been granted transfers the data stored in the RAM 62-2 to another unit 50-i via the data transfer bus 54, and the data transfer completion notifying unit 58-2 of the unit 50-2 sends out the notifying signal to the bus controller 52 at T7, which is one cycle before the data transfer completion cycle, to cancel the permission granted to the unit 50-2 at the bus cycle T8 which is the data transfer completion bus cycle.

Figure 14:
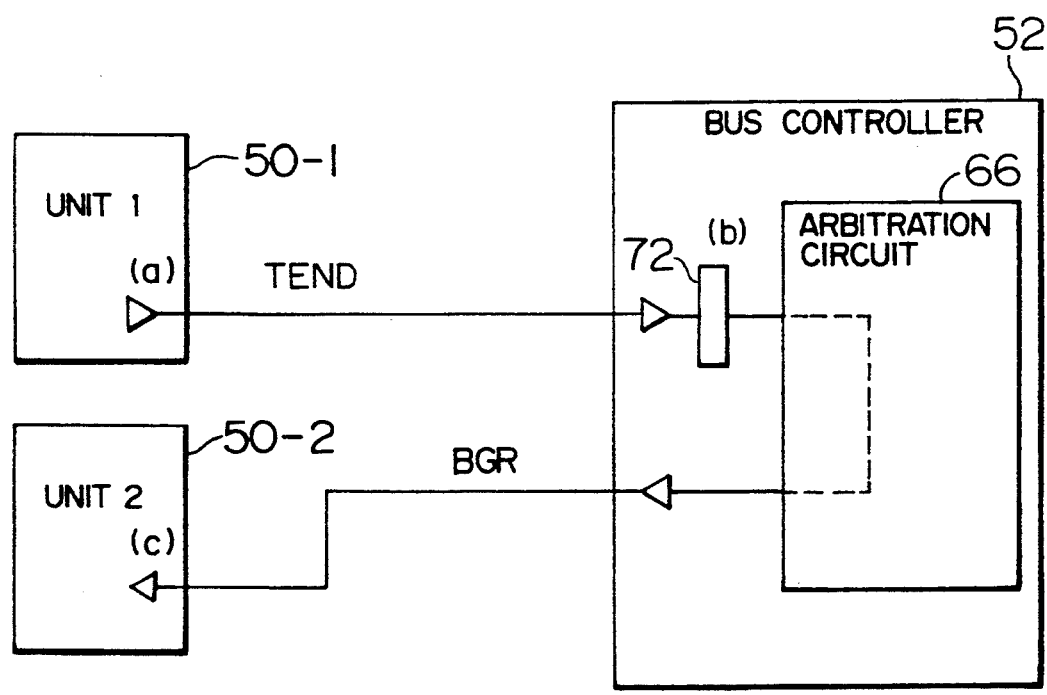
FIG. 14 illustrates a transmission path.

Thus, as shown in FIG. 14, the path and the time required for the notifying signal (TEND1) from the unit 50-1 (a) to be held in the FF 72 of the time adjusting unit 64 for one cycle (b) and required for the bus granting signal (BGR2) to be sent out to the subsequent unit 50-2 via the arbitration circuit 66 differ from those of the conventional bus control device. That is, it is not necessary for those processings to be done in one cycle and the processings (a) to (b) and (c) to (d) are executed in one cycle, respectively. Accordingly, the time interval corresponding to one cycle can be reduced to one half of that of the conventional device, and the bus cycle can thus be shortened.

Since the time interval of the single bus cycle can be shortened, high-speed and highly efficient bus control can be achieved.

A second embodiment of the present invention will be described below.

This embodiment differs from the first embodiment in that completion of the data transfer is notified beforehand to the bus controller 52 not by sending the notifying signal notifying switch over of the permission to the bus controller 52 but on the bus requesting signal line. In this way, the present invention can be carried out without increasing the number of signal lines.

The procedures of the processing executed in the second embodiment will be described below with reference to FIG. 12.

Figure 12:
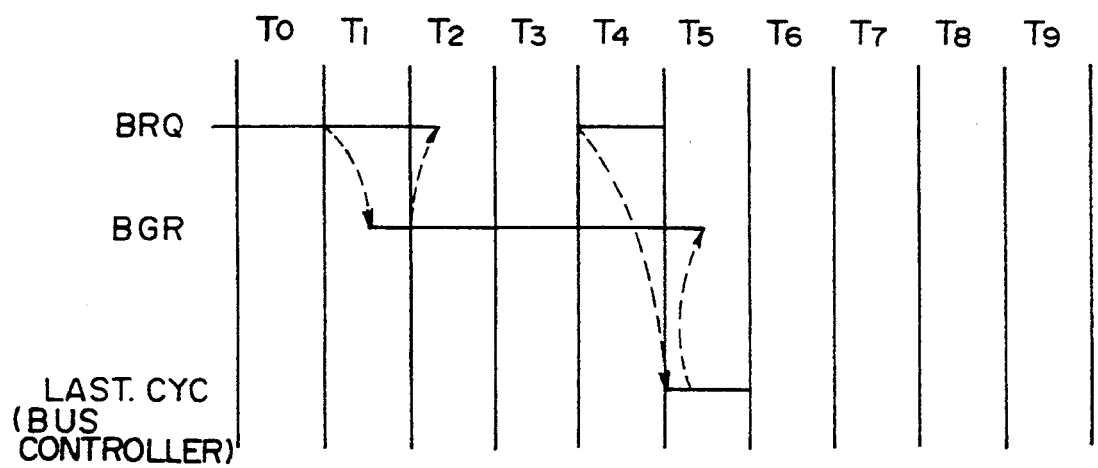
FIG. 12 is a timing chart of a second embodiment according to the present invention.

As shown in FIG. 12, when the bus requesting signal (BRQ) requesting use of the bus for data transfer is output from the unit 50-1, the arbitration circuit 66 of the bus controller 52 sends out the bus granting signal (BGR) granting the unit 50-1 permission to use the bus at the cycle T1.

Upon receipt of the bus granting signal (BGR), the control circuit 56-1 of the unit 50-1 instructs transfer of the data stored in the RAM 62-1 to the remote unit 50-i via the data transfer bus 54.

As the data transfer proceeds, the switch over notifying unit instructs the control circuit 56-1 at T4, which is one cycle before completion of the data transfer, to send out the bus requesting signal (BRQ) to the bus controller 52 as the notifying signal. The time adjusting unit 64 holds that notifying signal for one cycle in the similar manner to that of the first embodiment, and the transfer completion cycle detecting circuit 68 sends out the signal switch over instructing signal (LAST. CYC) to the arbitration circuit 66 at the bus cycle of the data transfer completion. Upon receipt of the signal switch over instructing signal, the arbitration circuit 66 cancels the permission granted to use the bus at the bus cycle T5 of the data transfer completion.

Thus, the data can be transferred at a high speed, and the time interval of the single bus cycle can be shortened. As a result, high-speed and highly efficient bus control can be achieved without employing a complicated structure, i.e., without providing a new signal line.

A third embodiment of the present invention will be described below.

In this embodiment, each of the units includes a control circuit designed to set the bus requesting signal high and to perform data transfer without setting the bus requesting signal low when it has received the bus granting signal from the bus controller.

Further, each of the units includes a switch over notifying/instructing unit which notifies completion of the data transfer at a bus cycle which precedes the bus cycle when the data transfer is completed in the unit which has been granted the permission to use the bus, and thus instructs the transfer control unit to set the bus requesting signal low as the notifying signal notifying switch over of the permission to use the bus at the bus cycle when the data transfer is completed. The bus controller includes a time adjusting unit which receives the low bus requesting signal, holds it until the bus cycle when the data transfer is completed, and sends out the notifying signal which has been held to the switch over instructing unit at that bus cycle. The bus controller also includes a switch over instructing unit which cancels the permission to use the bus granted to the unit where the data transfer has been completed at the bus cycle when the data transfer is completed when it has received the time adjusted notifying signal, and gives the permission to use the bus to a subsequent unit at that bus cycle when there is a subsequent unit that is requesting the use of the bus.

Figure 13:
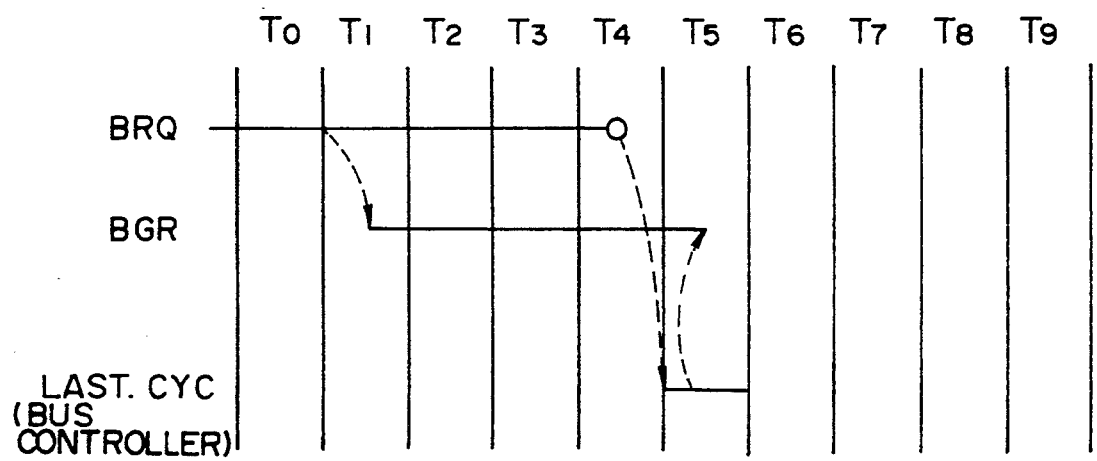
FIG. 13 is a timing chart of a third embodiment according to the present invention.

The procedures of the processing executed in the third embodiment will be described below with reference to FIG. 13.

In this embodiment, the control circuit maintains the bus requesting signal high until the bus cycle T4, which is one bus cycle before completion of the data transfer, and sets the bus requesting signal low when it is notified of completion of the data transfer from the switch over notifying unit.

The low bus requesting signal is sent out, as the notifying signal, to the bus controller at a bus cycle, which is one bus cycle before the data transfer is completed. Hence, the time adjusting unit holds the notifying signal for a single bus cycle, and cancels the permission to use the bus at the switch over instructing unit at the bus cycle when the data transfer is completed, and grants permission to use the bus at the same bus cycle when there is a unit who is requesting to use the bus.

Thus, the data can be transferred at a high speed, and the time interval of the single bus cycle can be shortened. As a result, high-speed and highly efficient bus control can be achieved.

What is claimed is:

1. A bus control device comprising:
   a data transfer bus on which data transfer is performed synchronously with a bus cycle; and
   a plurality of data processing units each connected to said data transfer bus and each of which performs the data transfer when a bus controller permits one unit to use the bus, said bus controller granting one of the units which have requested use of the bus permission to use the bus and switching over the permission to use the bus when said one unit has completed the data transfer at a transfer completion bus cycle, each of the units including a switch over notifying unit for sending, to said bus controller, a notifying signal notifying switch over of the permission to use the bus at a preceding bus cycle which precedes the bus cycle when the data transfer is completed, and said bus controller including a time adjusting unit for holding the notifying signal until the bus cycle when the data transfer is completed and for sending the notifying signal which has been held to a switch-over instructing unit at said bus cycle, and said switch over instructing unit for cancelling the permission to use the bus granted to the one unit which has completed the data transfer when the switch over instructing unit has received the time adjusted notifying signal, and for granting a subsequent unit, which is requesting permission to use the bus, permission to use the bus at the data transfer completion bus cycle.

2. A bus control device comprising:

a data transfer bus on which data transfer is performed synchronously with a bus cycle;

a plurality of data processing units each connected to said data transfer bus and each of which has a transfer control unit for outputting a requesting signal requesting use of said bus to a bus controller and for performing the data transfer when said bus controller permits one unit to use the bus, said bus controller sending out a bus granting signal granting use of said bus to one of the units which have requested use of the bus when there are requests for using said bus from the plurality of units and switching over the permission to use the bus when said one unit has completed the data transfer at a data transfer completion bus cycle, each of the units including a switch over notifying unit for instructing said transfer control unit to output the requesting signal requesting use of said bus as a notifying signal notifying switch over of the permission to use the bus at a preceding bus cycle which precedes the bus cycle when the data transfer is completed, and said bus controller including a time adjusting unit for holding the notifying signal until the bus cycle when the data transfer is completed and for sending the notifying signal which has been held to a switch over instructing unit at said bus cycle, and a switch over instructing unit for cancelling the permission to use the bus granted to the one unit which has completed the data transfer when the switch over instructing unit has received the time adjusted notifying signal and for granting a subsequent unit, which is requesting permission to use the bus, permission to use the bus, at said data transfer completion bus cycle.

3. A bus control device comprising:

a data transfer bus on which data transfer is performed synchronously with a bus cycle;

a plurality of data processing units each connected to said data transfer bus and each of which outputs a requesting signal requesting use of said bus to a bus controller and performs data transfer when said bus controller permits one unit to use the bus, said bus controller sending out a bus granting signal granting use of said bus to one of the units which have requested the use of the bus when there are requests for using said bus from the plurality of units and switching over the permission to use the bus when said one unit has completed the data transfer at a data transfer completion bus cycle, each of the units including a transfer control unit for setting high the requesting signal requesting said bus controller for use of said bus and for performing the data transfer when the transfer control unit has received from said bus controller a granting signal granting permission to use said bus but not setting low said bus requesting signal by said bus granting signal, and a switch over notifying unit for instructing said transfer control unit to set the bus requesting signal requesting use of said bus low as a notifying signal notifying switch over of the permission to use the bus which precedes the bus cycle when the data transfer is completed at a data transfer completion bus cycle, and said bus controller including a time adjusting unit for receiving the low bus requesting signal, holding the notifying signal until the bus cycle when the data transfer is completed and for sending the notifying signal which has been held to a switch-over instructing unit, and the switch over instructing unit for cancelling the permission to use the bus granted to the one unit which has completed the data transfer when the switch over instructing unit has received the time adjusted notifying signal, and for granting a subsequent unit, which is requesting permission to use the bus, permission to use the bus at the data transfer completion bus cycle.

4. A bus control method comprising the steps of:

a plurality of units, which are connected to a data transfer bus on which data transfer is controlled synchronously with a bus cycle, at least one unit making a request of using said bus;

granting permission to use said bus to one of the units which have requested to use said bus;

sending out a notifying signal notifying switch over of permission to use said bus at a preceding bus cycle which precedes bus cycle when the data transfer is completed; and cancelling the permission to use said bus granted to the unit which has completed the data transfer and instructing permission to use said bus to subsequent unit when there is said subsequent unit requesting use of said bus at the bus cycle when the data transfer is completed based on the notifying signal.

5. A bus control method comprising the steps of:

a plurality of units, which are connected to a data transfer bus on which data transfer is controlled synchronously with a bus cycle, at least one unit making a request of using said bus;

granting permission to use said bus to one of the units which have requested to use said bus;

maintaining a signal representing the request of use of said bus high even after the one unit has received permission to use said bus and setting said requesting signal requesting use of said bus low as a notifying signal notifying switch over of permission to use said bus at a preceding bus cycle which precedes the bus cycle when the data transfer is completed; and cancelling the permission to use said bus granted to the unit which has completed the data transfer and instructing permission to use said bus to subsequent unit when there is said subsequent unit requesting use of said bus at the bus cycle when the data transfer is completed based on the notifying signal.

* * * * *